Patented July 18, 1950

2,515,241

UNITED STATES PATENT OFFICE 2,515,241

NITROPHENYL ACYLAMINO ACYLOXY KETONES

Loren M. Long, Grosse Pointe Woods, Mich., assignor to Parke, Davis & Company, Detroit, Mich., a corporation of Michigan No Drawing. Application July 25, 1949,
Serial No. 106,732

5 Claims. (Cl. 260—477)

This application is a continuation-in-part of my copending applications Serial No. 45,976, filed August 24, 1948, now abandoned, and Ser. No. 60,182, filed November 15, 1948, and the invention relates to ketonic compounds and to methods for obtaining the same. More particularly, the invention relates to acylamidoacyloxy ketones having the general formula,

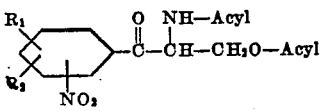

where $R_1$ and $R_2$ are the same or different and represent hydrogen, halogen, lower alkyl or lower alkoxy radicals. The term "Acyl" as used herein refers to carboxylic acid acyl radicals and includes lower aliphatic acyl, halogen substituted lower aliphatic acyl, benzoyl, substituted benzoyl, aryliphatic acyl and the like radicals.

In accordance with the invention products having the above formula are produced by acylation of acylamido hydroxy ketones of formula,

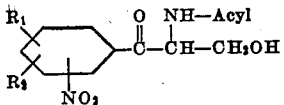

where $R_1$ and $R_2$ have the same significance as given above. Amino hydroxy ketone compounds or their acid addition salts can also be used as the starting materials in the practice of the invention but the preferred starting materials are the acylamido hydroxy ketones. The amino hydroxy ketones which may also be employed have the following formula in their free base form:

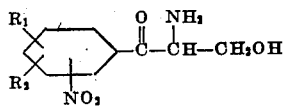

where $R_1$ and $R_2$ are the same as set forth above.

The acylation of the acylamido hydroxy ketones is carried out by treating the starting material with an acyl halide or acyl anhydride under substantially anhydrous conditions either alone or in the presence of an acylation catalyst such as an inorganic base, an alkaline salt of an organic acid, a tertiary organic base, an aromatic sulfonic acid or sulfuric acid. The acylation can, in general, be carried out at a temperature varying from about 10–140° C. but the preferred temperature for the reaction is between about 60–120° C. An inert organic solvent such as benzene, petroleum ether, toluene and the like can be used for the reaction, if desired, although in most cases it is more expedient to omit the use of a solvent and to merely use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethyl morpholine, N-ethyl piperidine, N,N-dimethyl aniline, p-toluene sulfonic acid and sulfuric acid.

When the amino hydroxy ketones are used as the starting products, the acylation is carried out in the same manner. If the starting material is employed in the form of one of its acid addition salts, it is preferable to carry out the reaction in the presence of an alkaline catalyst or to at least partially neutralize the salt by the addition of a weakly alkaline material such as an alkali metal salt of the acid corresponding to the acylating agent.

The products of the invention are particularly useful in the synthesis of organic compounds possessing antibiotic activity. For example, the p-nitrophenyl products of Example 1, 2 and 3 can be converted to the corresponding [dl]-ψ-1-p-nitrophenyl-2-acylamidopropane-1,3-diol compounds by reduction with aluminum isopropylate and these products converted by hydrolysis, resolution and acylation with a dichloroacetic acid to [dl]-ψ-1-p-nitrophenyl-2-dichloroacetamido-propane-1,3-diol, a product possessing outstanding and unique antibiotic activity. The methods used in these transformations are described more fully and claimed in the following copending applications of Harry M. Crooks et al.: Ser. No. 15,264, filed March 16, 1948, now Patent No. 2,483,884, issued October 4, 1949; Ser. No. 76,179, filed February 12, 1949, now Patent No. 2,483,885, issued October 4, 1949; Ser. No. 76,180, filed February 12, 1949.

The invention is illustrated by the following examples.

Example 1

[a] 71 g. of p-nitro-ω-bromoacetophenone dissolved in 300 cc. of chloroform is added to a solution of 46 g. of hexamethylene tetramine in 600 cc. of chloroform. The solid product begins to separate almost immediately and the temperature of the reaction mixture rises to about 50° C. After allowing the mixture to stand for about two hours the p-nitro-ω-bromoacetophenonehexamethylene tetramine complex is collected, washed with a little chloroform and dried. The formula of this product is:

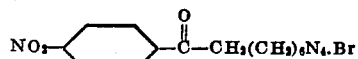

The p-nitro-ω-bromoacetophenone-hexamethylene tetramine complex prepared above is mixed with a cold solution of 500 cc. of absolute ethanol and 100 cc. of concentrated hydrochloric acid and the mixture stirred overnight at room temperature. The solid product which consists of the hydrochloride salt of p-nitro-ω-aminoacetophenone contaminated with minor amounts of the hydrobromide salt and ammonium chloride is collected, washed with 200 cc. of ice cold water to remove the ammonium chloride and dried. The formula of this compound is:

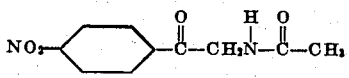

46 g. of the p-nitro-ω-aminoacetophenone hydrochloride prepared above is mixed with 200 cc. of acetic anhydride and 25 g. of sodium acetate. The mixture is stirred at room temperature and small quantities of ice and water added from time to time. Stirring is continued until the mixture becomes clear and reaches a temperature of about 70° C. The solution is diluted with 900 cc. of water, cooled to 5° C. and the p-nitro-ω-acetamidoacetophenone collected; M. P. 158–161° C. p-Nitro-ω-acetamidoacetophenone has the formula,

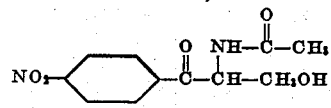

11.1 g. of p-nitro-ω-acetamidoacetophenone is mixed with 55 cc. of methanol and 17 cc. of 36–38% aqueous formaldehyde. 0.4 g. of sodium bicarbonate is added and the mixture stirred at 35° C. for about one hour and a half during which time the solid product separates. The mixture is cooled and stirred for one-half hour, the solid product collected, washed with water and dried at 60° C. The product thus obtained is p-nitro-α-acetamido-β-hydroxypropriophenone, M. P. 166–7° C., which has the formula,

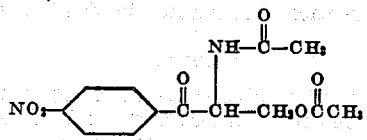

[b] 8 g. of p-nitro-α-acetamido-β-hydroxypropiophenone is heated at about 75° C. for one-half hour with 20 cc. of acetic anhydride containing a small amount of concentrated sulfuric acid. The reaction mixture is evaporated to dryness in vacuo, the residue washed with ice water and purified by recrystallization from methanol or ethanol. The product thus obtained is p-nitro-α-acetamido-β-acetoxypropiophenone which has the formula,

[c] 25.2 g. of p-nitro-α-acetamido-β-hydroxypropiophenone is mixed with 100 cc. of acetic anhydride and 0.5 cc. of concentrated sulfuric acid. The mixture is heated at about 50° C. on a steam bath until a clear solution is obtained. After standing overnight the solution is concentrated to dryness in vacuo and the residue mixed with water. The solid p-nitro-α-acetamido-β-acetoxypropiophenone is collected, dissolved in hot alcohol and the solution diluted with warm water. The crystalline product which separates upon cooling is collected and dried; M. P. 126–30° C. Recrystallization from ethyl acetate raises the M. P. to 129° C.

Example 2

3.21 g. of p-nitro-α-dichloroacetamido-β-hydroxypropiophenone is mixed with 9 cc. of acetic anhydride and 2 drops of concentrated sulfuric acid added to the mixture. The reaction mixture is allowed to stand for a few minutes and then diluted with water and stirred until the excess acetic anhydride is hydrolyzed. The solid product is filtered off, washed with water and dried; M. P. 120–3° C. Recrystallization from benzene yields the desired pure p-nitro-α-dichloroacetamido-β-acetoxypropiophenone melting at 124° C. This product has the formula,

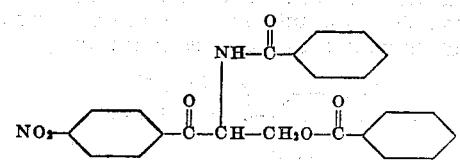

Example 3

15.2 g. of p-nitro-α-benzamido-β-hydroxypropiophenone is heated at about 60° C. for one hour with 20 g. of benzoic anhydride and 0.3 cc. of concentrated sulfuric acid. The reaction mixture is treated with 200 cc. of cold water and the solution made alkaline with an excess of 10% sodium hydroxide solution. After standing about one-half to three-quarters of an hour the crystalline p-nitro-α-benzamido-β-benzoxypropiophenone is collected, washed with water and purified by recrystallization from ethanol. This product which has the formula,

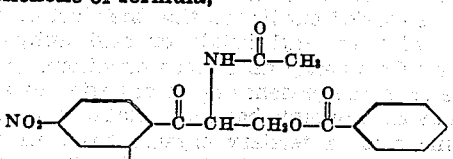

is a white, crystalline solid insoluble in water but soluble in hot alcohol.

Example 4

A mixture consisting of 10 g. of o-methyl-p-nitro-α-acetamido - β - hydroxypropiophenone and 20 g. of benzoic anhydride is heated at 70° C. for about one-half to three-quarters of an hour. The mixture is cooled, treated with 75 cc. of water and an excess of cold sodium hydroxide solution added. After standing for a few minutes the precipitate is collected, washed well with water and purified by recrystallization from methanol or ethanol. The product thus produced is o-methyl - p - nitro-α - acetamido - β - benzoxypropiophenone of formula,

Example 5

A mixture consisting of 8.8 g. of m-methoxy-p-nitro - α - p' - toluylamido - β - hydroxypropiophenone, 6 g. of succinic anhydride and 2 drops of concentrated sulfuric acid is heated at 60° C. for about one hour. 150 cc. of cold water is added to the reaction mixture and the insoluble product is collected. The insoluble product is suspended in 100 cc. of cold water and the solution made alkaline to pH 10 by the addition of 10 N sodium hydroxide solution. The solution is extracted with ethyl acetate, the aqueous phase decolorized with charcoal and the clarified solution acidified with dilute hydrochloric acid. The insoluble product which consists of m-methoxy-p-nitro-α-p'-toluylamido-β-(β'-carboxypropionyloxy)-propiophenone is collected, washed with water and purified by recrystallization from ethanol. The formula for this white, crystalline product is,

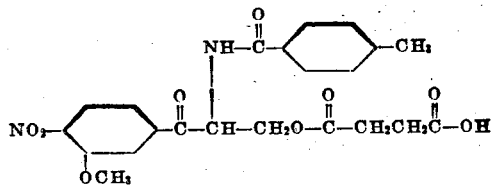

This compound is practically insoluble in water but soluble in dilute alkali and in hot alcohol.

*Example 6*

9 g. of 2-nitro-4,5-dimethyl-α-phenacetamido-β-hydroxypropiophenone is heated with 10 g. of phenylacetic anhydride and 0.1 cc. of concentrated sulfuric acid with stirring at 60° C. for one hour. The reaction mixture is treated with 200 cc. of cold water, made alkaline to pH 10 with 10 N sodium hydroxide solution and allowed to stand for one hour. The insoluble product is collected, washed well with water and purified by recrystallization from ethanol. The white, crystalline water-insoluble product thus obtained is 2-nitro-4,5-dimethyl-α-phenacetamido-β-phenacetoxypropiophenone of formula,

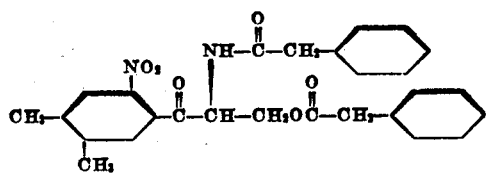

*Example 7*

8 g. of 3-nitro-5-chloro-α-(α'-chloropropionamido)-β-hydroxypropiophenone is mixed with 8 g. of dry pyridine and the mixture cooled to 0° C. 5 g. of chloroacetyl chloride is added dropwise with stirring, keeping the temperature at about 0° C. After the addition has been completed the mixture is stirred for one-half hour and then treated with 150 cc. of ice water. The insoluble product is collected, washed well with water and purified by recrystallization from ethanol or methanol. The white, crystalline compound thus obtained is 3-nitro-5-chloro-α-(α'-chloropropionamido)-β-chloroacetoxypropiophenone of formula,

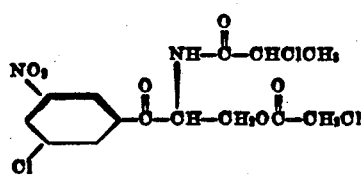

The α-acylamido-β-hydroxypropiophenones and the corresponding α-amino-β-hydroxypropiophenones used as starting materials in the practice of the invention may be prepared as described in my copending applications Ser. No. 60,182, filed November 15, 1948, and Serial No. 106,731, filed under even date with the instant application. The process described and claimed in said application Ser. No. 60,182 for the preparation of the α-acylamido-β-hydroxypropiophenones involves reacting a nitro substituted ω-acylamidoacetophenone with formaldehyde in the presence of an alkaline condensation catalyst. A specific example of the preparation of one of the products used as a starting material, p-nitro-α-acetamido-β-hydroxypropiophenone, is given in Example 1 (a). The process described in said application Serial No. 106,731 for the preparation of the α-amino-β-hydroxypropiophenone starting materials involves hydrolysis of the corresponding α-acylamido-β-hydroxypropiophenone compound. The hydrolysis is preferably carried out using aqueous mineral acid. A specific example of the preparation of one of the starting materials is as follows:

50.4 g. of p-nitro-α-acetamido-β-hydroxypropiophenone in 500 cc. of 18% hydrochloric acid is heated on a steam bath for forty-five minutes and then the solution concentrated to dryness in vacuo after extraction of the solution with ethyl acetate. The solid residue which consists of p-nitro-α-amino-β-hydroxypropiophenone hydrochloride is ground with a little absolute ethanol, collected and washed with absolute ethanol; M. P. 182° C. dec. Recrystallization from hot absolute ethanol (1 g. per 50 cc.) raises the M. P. to 182–183° C.

What I claim is:

1. A compound of the formula

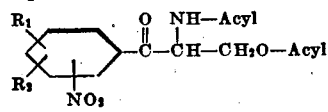

where $R_1$ and $R_2$ are members of the class consisting of hydrogen, halogen, lower alkyl and lower alkoxy radicals and acyl is a carboxylic acid acyl radical.

2. A compound of the formula

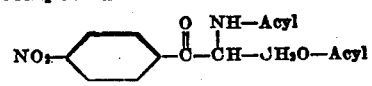

where acyl is a carboxylic acid acyl radical.

3. A compound of the formula

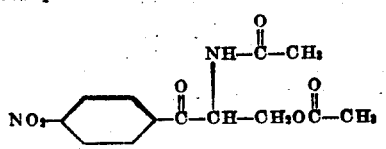

4. A compound of the formula

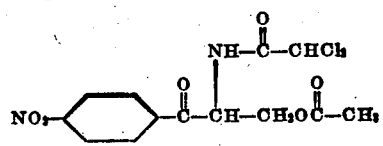

5. A compound of the formula

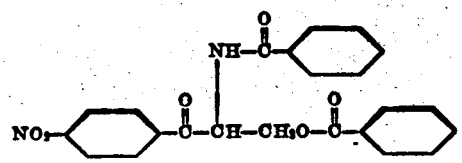

LOREN M. LONG.

No references cited.